United States Patent
Sakuma et al.

(10) Patent No.: US 7,046,881 B2
(45) Date of Patent: May 16, 2006

(54) MANUFACTURING METHOD FOR OPTICAL COUPLER/SPLITTER AND METHOD FOR ADJUSTING OPTICAL CHARACTERISTICS OF PLANAR LIGHTWAVE CIRCUIT DEVICE

(75) Inventors: Ken Sakuma, Sakura (JP); Shimon Ishikawa, Sakura (JP); Tomoko Shikata, Sakura (JP); Hirokuni Ogawa, Sakura (JP); Hideyuki Hosoya, Sakura (JP); Akira Wada, Sakura (JP)

(73) Assignee: Fujikura, Ltd., Tokyo (JP)

( * ) Notice: Subject to any disclaimer, the term of this patent is extended or adjusted under 35 U.S.C. 154(b) by 384 days.

(21) Appl. No.: 10/060,797

(22) Filed: Jan. 29, 2002

(65) Prior Publication Data

US 2003/0021536 A1    Jan. 30, 2003

(30) Foreign Application Priority Data

Jul. 30, 2001    (JP)    ............................ P2001-230371

(51) Int. Cl.
  *G02B 6/26*    (2006.01)
  *G02B 6/10*    (2006.01)
(52) U.S. Cl. ........................................ 385/45; 385/123
(58) Field of Classification Search .................. 385/45, 385/48, 39, 123, 141
  See application file for complete search history.

(56) References Cited

U.S. PATENT DOCUMENTS 5,978,538 A    11/1999   Miura et al.
6,154,593 A    11/2000   Miura et al.

FOREIGN PATENT DOCUMENTS

| JP | 6-51145 | 2/1994 |
|----|---------|--------|
| JP | 7-63936 | 3/1995 |
| JP | 9-311237 | 12/1997 |
| JP | 10-288799 | 10/1998 |
| JP | 10-332971 | 12/1998 |
| JP | 11-167036 | 6/1999 |
| JP | 11-231151 | 8/1999 |
| JP | 2001-311847 | 11/2001 |

OTHER PUBLICATIONS

Davis, K., et al., "Writing waveguides in glass with a femtosecond laser," Optics Letters, vol. 21, No. 21, Nov. 1, 1996, pp. 1729-1731.

(Continued)

*Primary Examiner*—Hwa (Andrew) Lee

(57) ABSTRACT

The present invention relates a method for manufacturing an optical coupler/splitter. A Y-shaped waveguide core is formed by focusing a laser beam into a cladding layer that is formed from a glass material. At least one portion of this Y-shaped waveguide core other than the input port and the output ports is treated as a refractive index adjustment area. After the portions of the Y-shaped waveguide core other than the refractive index adjustment area have been formed by focusing a laser beam, signal light is inputted into the input port of the Y-shaped waveguide core and the signal light outputted from the output ports of the Y-shaped waveguide core are monitored. The refractive index of the refractive index adjustment area is determined based on the result of the monitoring and is adjusted by focusing a laser beam repeatedly.

16 Claims, 6 Drawing Sheets

OTHER PUBLICATIONS

Miura, K., et al., "Photowritten optical waveguides in various glasses with ultrashort pulse laser," Applied Physics Letter, vol. 71, No. 23, Dec. 8, 1997, pp. 3329-3331.

Miura, K., et al., "Photo-Induced Refractive Index Changes in Glasses with Ultra-Short Pulse Laser," Laser Review, Feb., 1998, pp. 150-154.

Miura, K., "Photowritten Optical Waveguide in Various Glasses with a Femtosecond Laser," Hirao Active Glass Project NEWS Final, Aug. 1999, pp. 5-12.

Miura, K., et al., "Preparation and optical properties of fluoride glass waveguides induced by laser pulses," Journal of Non-Crystalline Solids 256&257, 1999, pp. 212-219.

Homoelle, D., et al., "Infrared photosensitivity in silica glasses exposed to femtosecond laser pulses," Optical Letters, vol. 24, No. 18, Sep. 15, 1999, 1999, pp. 1311-1313.

Kondo, Y., et al., "Glass machining by femtosecond laser pulses," Jpn. Journal Applied Physics, vol. 69, No. 4, 2000, pp. 411-414.

Streltsov, A., et al., "Fabrication and analysis of a directional coupler written in glass by nanojoule femtosecond laser pulses," Optics Letters, vol. 26, No. 1, Jan. 1, 2001, pp. 42-43.

Schaffer, C., et al., "Micromachining bulk glass by use of femtosecond laser pulses with nonojoule energy," Optics Letters, vol. 26, No. 2, Jan. 15, 2001, pp. 93-95.

Schaffer, C., et al., "Micromachining using ultrashort pulses from a laser oscillator," Optics & Photonics News, Apr. 2001, pp. 20-23.

Sudrie, L., et al., "Study of damage in fused silica induced by ultra-short IR laser pulses," Optics Communications 191, May 8, 2001, pp. 333-339.

Minoshima, K., et al., "Femtosecond nonlinear fabrication of glass photonic devices by an unamplified laser," The 8th International Workshop on Femtosecond Technology, Jun. 28-29, 2001, Tsukuba, Japan, pp. 159.

Efimov, O., et al., "Waveguide writing in chalcogenide glasses by a train of femtosecond laser pulses," Optical Materials 17, (2001), pp. 379-386.

Kondo et al., "Fabrication of long-period fiber gratings by focused irradiation of infrared femtosecond laser pulses," Optic Letters, vol. 24, No. 10, May 15, 1999, pp. 646-648.

Kondo et al., "Long Period Fiber Grating By Focused-Irradiation Of Femtosecond Laser Pulses," Extended Abstracts of the 46th Spring Meeting of the Japan Society of Applied Physics and Related Societies, No. 3, 1999, p. 1238.

MANUFACTURING METHOD FOR OPTICAL COUPLER/SPLITTER AND METHOD FOR ADJUSTING OPTICAL CHARACTERISTICS OF PLANAR LIGHTWAVE CIRCUIT DEVICE

BACKGROUND OF THE INVENTION

1. Field of the Invention

The present invention relates to a manufacturing method for optical couplers/splitters and to a method for adjusting the optical characteristics of planar lightwave circuit devices. In particular, the present invention relates to a tap coupler device for splitting signal light from a communication circuit and entering it into a monitoring photodiode.

2. Description of the Related Art

As conventional optical couplers/splitters, optical fiber couplers/splitters and planar lightwave circuits (abbreviated to PLC) have been proposed.

There are various configurations of PLC devices such as, for example, Y-shaped optical waveguide cores, Mach-Zehnder interferometers, and arrayed waveguide grating (abbreviated to AWG) which are used as the optical couplers/splitters or optical multiplexers/demultiplexers.

In the optical fiber couplers/splitters, because the adjustment of optical characteristics such as the branching ratio and the like is comparatively simple during the manufacturing process, the design and manufacturing of the optical fiber couplers/splitters having various branching ratios is possible, so that this type of optical fiber couplers/splitters are suitable for large item small volume production. On the other hand, because they are formed from plural optical fibers, it is difficult to integrate these devices.

In contrast to this, the PLC devices are suitable for highly integrated optical devices. However, although PLC devices are suitable for mass production of devices having identical characteristics, they have the problem of not being suited for large item small volume production.

FIG. 6A is a plan view showing an example of a conventional PLC device. FIG. 6B is a cross sectional view along the line A—A in FIG. 6A.

The symbol 2 in the drawings indicates a substrate. A cladding layer 3 is formed on this substrate 2, and Y-shaped waveguide core 4 is provided inside the cladding layer 3.

A silicon substrate or the like, for example, may be used for the substrate 2. The cladding 3 and the Y-shaped waveguide core 4 may be formed, for example, from silica glass.

The Y-shaped waveguide cores 4 is formed from a material having a higher refractive index than the cladding layer 3 in order for the Y-shaped waveguide core 4 to act as an optical wave guide. If the cladding layer 3 is formed, for example, from pure silica glass, germaniun doped silica glass material or the like is used for the Y-shaped waveguide core 4.

The Y-shaped waveguide core 4 is formed in such a way that a core having a cross-sectional shape of a square-rod is split at a portion along length of the core into two branch cores. The Y-shaped waveguide cores 4 is comprised by an input-side linear section 4a extending from the input side; a branching section 4b which is formed on the output side of the input-side linear section 4a and is formed by gradually widening the input-side linear section 4a; a separation section 4c formed in curved or linear shape so that two branched cores 5a and 5b separate from each other as they extend from the branching section 4b; and an output-side linear section 4d in which the branched cores 5a and 5b are disposed in parallel to each other.

In the branching section 4b, the input-side linear section 4a extends from the input end of the branching section 4b, and the branching cores 5a and 5b extend from the bottom perimeter opposite to the input end of the branching section 4b.

The port 6a on the input side of the Y-shaped waveguide core 4 and two ports 6b and 6c on the output side of the Y-shaped waveguide core 4 are placed on the same flat plane that is also parallel to the bottom and top surfaces of the substrate 2.

When signal light is inputted into the port 6a, the signal light is outputted from both the ports 6b and 6c after being split into two branches at a predetermined branching ratio.

A conventional PLC coupler/splitter device is manufactured by the following process. Firstly, for example, the pattern for the Y-shaped waveguide core 4 is designed. A photomask is then prepared based on this pattern, and the photomask pattern is transferred using photolithography and the Y-shaped waveguide core 4 is formed. However, because this photomask is expensive, it has not been possible to prepare photomasks for a variety of characteristics.

Furthermore, it has not been possible to carry out the minute adjustments of the characteristics such as the branching ratio and the like in the manufacturing process using optical characteristics monitoring equipment, because the Y-shaped waveguide core 4 is invariably formed almost same with the photomask pattern.

Concerning other PLC devices such as an AWG or Mach-Zehnder interferometer, the same problem exists because the manufacturing process is the same.

In addition, the minute adjustments of the optical characteristics can be contributed to an improvement in the actual production yield not only during the manufacturing process but also after the completion of manufacturing. Therefore, technology has been looked for that enables minute adjustments of the optical characteristics of the PLC devices after the completion of manufacturing process. It can be useful not only for optical coupler/splitter devices, but also for other devices such as, for example, gain equalizers, dispersion compensators, and the like that use Mach-Zehnder interferometers.

The present invention was conceived in view of the above described circumstances and it is an aim thereof to provide a method for manufacturing optical couplers/splitters that allows ease of integration and allows the optical characteristics such as the branching ratio to be adjusted during the manufacturing, and to provide a method for adjusting the optical characteristics of PLC devices after the completion of manufacturing process.

To put it concretely, it is an aim of the present invention to provide a method for manufacturing optical couplers/splitters and a method for adjusting the optical characteristics of PLC devices that allow minute adjustments to be made to the optical characteristics both during the manufacturing and after the completion of manufacturing of PLC devices including PLC type couplers/splitters.

In addition, it is an aim of the present invention to provide a method for manufacturing optical couplers/splitters and a method for adjusting the optical characteristics of PLC devices that allow these problems to be solved at as low a cost as possible.

SUMMARY OF THE INVENTION

In order to achieve the above described aims, the first aspect of the present invention is a method for manufacturing an optical coupler/splitter that is provided with plural ports for performing light input and light output inside a cladding layer formed from a glass material, and in which a waveguide core is formed that optically connects the ports, comprising the steps of: setting at least one portion between the ports as a refractive index adjustment area and for forming portions of the waveguide core other than the refractive index adjustment area; inputting signal light into one port and monitoring the signal light outputted from other ports; and adjusting optical characteristics of the optical coupler/splitter by adjusting refractive index of the refractive index adjustment area by focusing a laser beam during the monitoring.

The second aspect of the present invention is the method for manufacturing an optical coupler/splitter according to the first aspect, wherein the portions of the waveguide core other than the refractive index adjustment area are formed by focusing a laser beam.

The third aspect of the present invention is a method for manufacturing an optical coupler/splitter that is provided with plural ports for performing light input and light output inside a cladding layer formed from a glass material, and in which a waveguide core is formed that optically connects the ports, comprising the steps of: forming the waveguide core; inputting signal light into one port and monitoring the signal light outputted from other ports; and adjusting optical characteristics of the optical coupler/splitter by focusing a laser beam into the waveguide core between the input port and the output ports during the monitoring.

The fourth aspect of the present invention is the method for manufacturing an optical coupler/splitter according to the third aspect, wherein the waveguide core is formed by focusing a laser beam.

The fifth aspect of the present invention is a method for manufacturing an optical coupler/splitter that is provided with plural ports for performing light input and light output inside a cladding layer formed from a glass material, and in which a waveguide core is formed that optically connects the ports, comprising the steps of: forming the waveguide core; focusing a laser beam into the core; scanning the core by shifting the focal point of the laser beam along the core repeatedly; and adjusting optical characteristics of the optical coupler/splitter by changing the number of scanning.

The sixth aspect of the present invention is the method for manufacturing an optical coupler/splitter according to the fifth aspect, wherein, the number of scanning is determined beforehand based on the relationship between the optical characteristics of the optical coupler/splitter and the number of scanning.

The seventh aspect of the present invention is the method for manufacturing an optical coupler/splitter according to the fifth or sixth aspects, wherein the waveguide core is formed by focusing the laser beam.

The eighth aspect of the present invention is the method for manufacturing an optical coupler/splitter according to any of the first through seventh aspects, wherein at least one of the laser beam used to adjust the optical characteristics and the laser beam used to form the waveguide core is a femto-second laser.

The ninth aspect of the present invention is the method for manufacturing an optical coupler/splitter according to any of first through eighth aspects, wherein the optical coupler/splitter is a Y-branching optical splitter.

The tenth aspect of the present invention is the method for manufacturing an optical coupler/splitter according to any of the first through ninth aspects, wherein the optical coupler/splitter is a tap coupler.

The eleventh aspect of the present invention is a method for adjusting optical characteristics of a planar lightwave circuit device that is provided with plural ports for performing light input and light output inside a cladding layer formed from a glass material, and in which a waveguide core is formed that optically connects the ports, comprising the steps of: inputting signal light into one port and monitoring signal light outputted from other ports; and adjusting optical characteristics of the planar lightwave circuit device by focusing a laser beam into the waveguide core between the input port and the output ports during the monitoring.

The twelfth aspect of the present invention is the method for adjusting optical characteristics of a planar lightwave circuit device according to the eleventh aspect, wherein the step of focusing a laser beam into the waveguide core is further comprising the steps of: shifting the focal point of the laser beam along the core repeatedly; and adjusting optical characteristics of the device by changing the number of scanning.

The thirteenth aspect of the present invention is the method for adjusting optical characteristics of a planar lightwave circuit device according to the eleventh or twelfth aspect, wherein the step of adjusting the optical characteristics of the device is lengthening the effective optical path length of the waveguide core by raising the refractive index of the portion of the core by focusing the laser beam.

The fourteenth aspect of the present invention is the method for adjusting optical characteristics of a planar lightwave circuit device according to any of the eleventh through thirteenth aspects, wherein the laser beam is a femto-second laser.

DESCRIPTION OF THE PREFERRED EMBODIMENTS

Figure 1A:
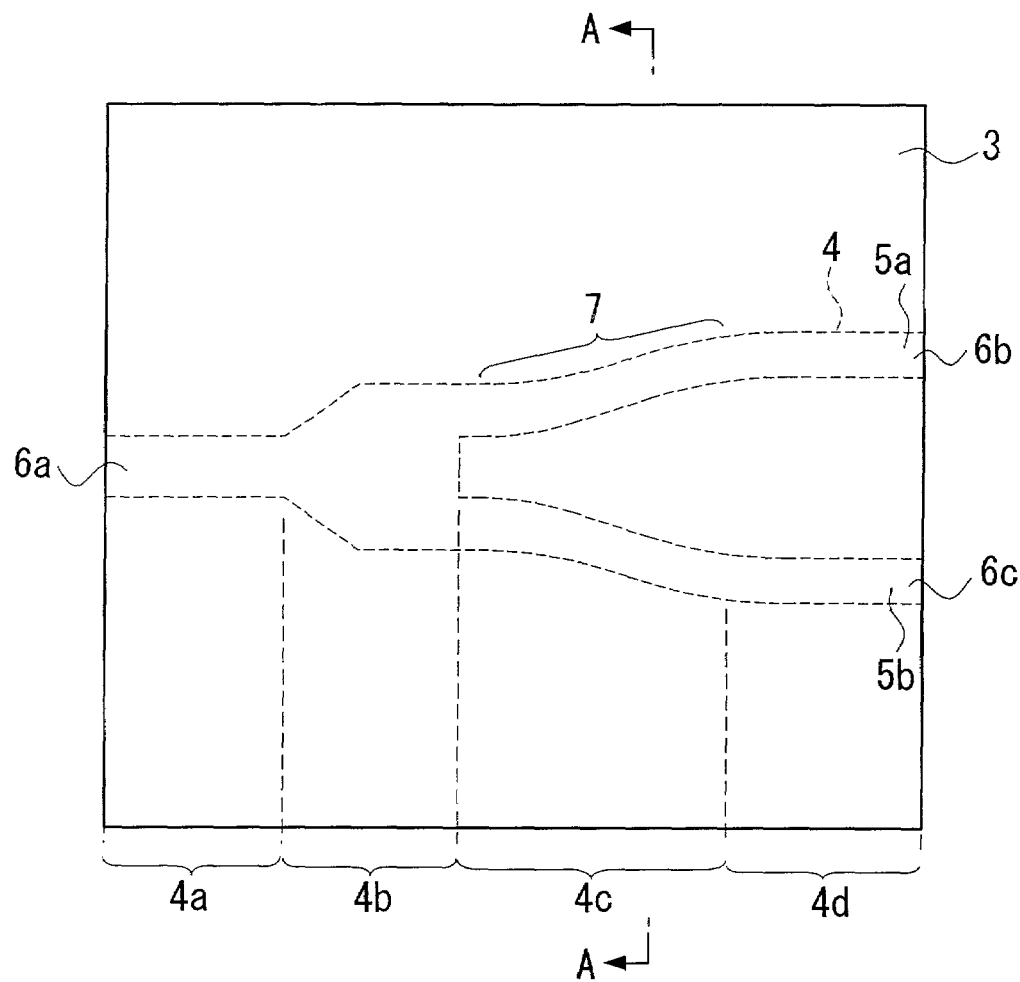
FIG. 1A is a plan view showing an example of the method for manufacturing an optical coupler/splitter of the present invention.
Figure 1B:
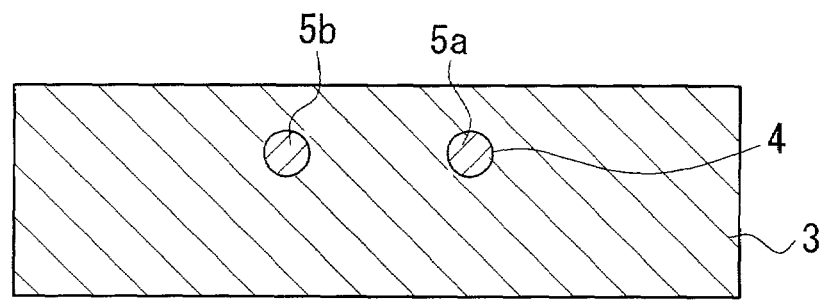
FIG. 1B is a cross sectional view taken along the line A—A in FIG. 1A.
Figure 6A:
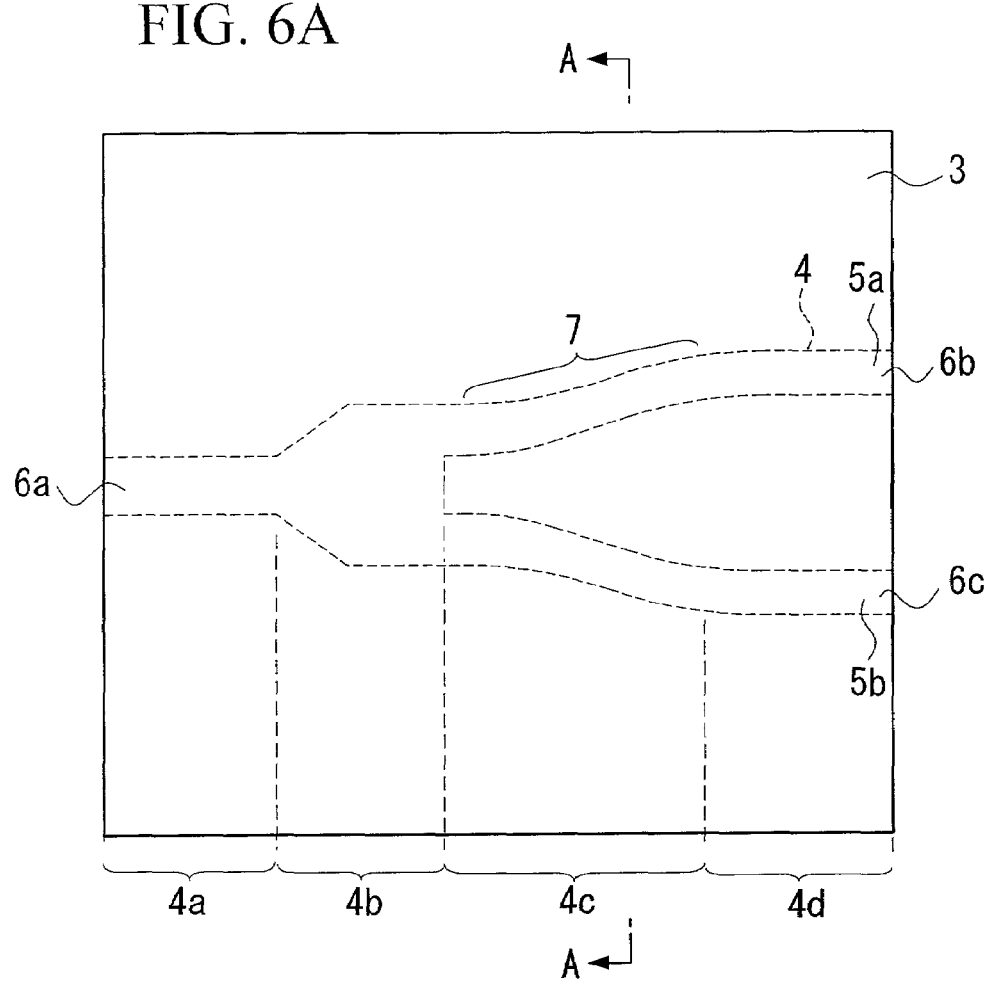
FIG. 6A is a plan view showing an example of a conventional optical coupler/splitter.
Figure 6B:
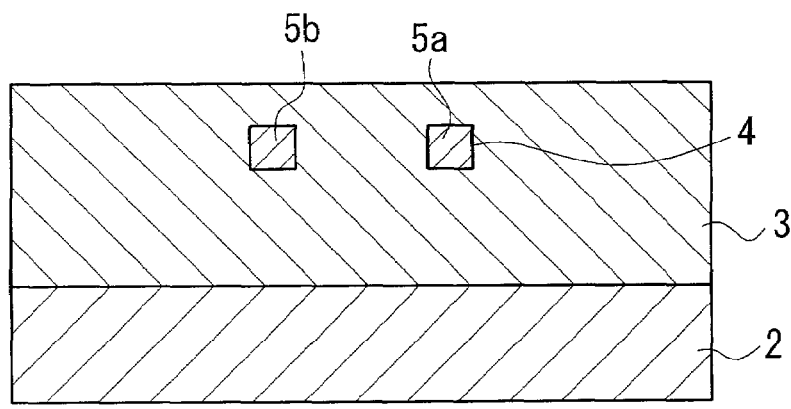
FIG. 6B is a cross sectional view taken along the line A—A in FIG. 6A.

FIGS. 1A and 1B show an example of an optical coupler/splitter of the present invention. Structural elements that are the same as those shown in FIGS. 6A and 6B are given the same descriptive symbols and a description thereof is omitted. A description will now be given of the method for manufacturing this optical coupler/splitter.

Firstly, a glass substrate formed from a glass material such as silica glass, fluoride glass, chalcogenide glass, phosphate glass, borate glass, chloride glass, sulfide glass, and the like is prepared and this is used for the cladding layer 3. Examples of the silica glass include pure silica glass, germaniun doped silica glass, and the like.

Next, using a lens or the like, a laser beam is irradiated from the exterior of the cladding layer 3 and focused into a point at the position where the Y-shaped waveguide core 4 is to be formed. As a result, the refractive index of this point is increased.

The laser beam is preferably provided with a high peak output such as is disclosed in Japanese Patent Application, First Publication No. 9-311237, or Hirao Active Glass NEWS Final (August, 1999), pp 5–14, and the like. Specifically, what is known as a femto-second laser that has a repetition frequency of 10 kHz or more and preferably 100 kHz or more and maintains a peak power intensity of $10^5$ $W/cm^2$ or more at the focusing point is preferable.

These documents disclose that by focusing a laser beam having this kind of high peak power from the exterior of a glass material such as silica glass or the like into the interior thereof, the refractive index of the focal point is increased by the order of $10^{-3}$ to $10^{-2}$ so that a waveguide core can be formed.

Note that, as is shown in FIG. 1B, the cross sectional configuration of the waveguide core formed by the irradiation of a laser beam is normally substantially circular. Moreover, in order to adjust the refractive index of the waveguide core to the desired value, normally, the laser beam is repeatedly irradiated.

In addition, preferably, by moving the cladding layer 3 to match the pattern of the Y-shaped waveguide core 4, when the focal point of the laser beam is scanned, and then the Y-shaped waveguide core 4 is formed.

At this time, in the two branched cores 5a and 5b, the separation section 4c of the one branched core 5a is taken as the refractive index adjustment area 7 and the laser beam is focused onto this portion. Accordingly, at this time, the waveguide core of the branched core 5a extended from the branching section 4b to the output-side linear section 4d is separated by the refractive index adjustment area 7. In contrast, in the branched core 5b, since there is no refractive index adjustment area 7 has been formed, a single core that is continuous from the branching section 4b to the output side direct linear section 4d.

The single port 6a on the input side is connected to a light source while the two ports 6b and 6c on the output side are connected to a measuring device such as an optical power meter.

Signal light is entered into the port 6a and, while the power of the signal light outputted from the ports 6b and 6c is monitored, a laser beam is focused into the refractive index adjustment area 7, and the continuous branched core 5a is formed from the branching section 4b to the output-side linear section 4d, preferably by scanning the focal point of the laser beam by moving the cladding layer 3. Initially, the majority of the signal light is outputted from the port 6c on the branched core 5b side, however, as the refractive index of the refractive index adjustment area 7 is raised, the light is outputted from the port 6b on the branched waveguide 5a side.

Note that if the port 6a and the respective ports 6b and 6c are connected so as to be optically continuous, then it is not absolutely necessary for them to be continuous physically. This is because, if the waveguide core is physically separated partway along but the separated end portions are placed comparatively close to each other, then the signal light is guided between one end portion and the other end portion and the light can be propagated from the port 6a to the respective ports 6b and 6c.

The irradiation of a focused laser beam is then ended at the point in time when the desired branching ratio is obtained.

Thus, in the present invention, it is possible to form a waveguide core focusing a laser beam preferably provided with high peak power while monitoring the optical characteristics, and to adjust the optical characteristics of the waveguide core in the manufacturing process thereof even for a planar optical coupler/splitter.

Note that, in order to monitor the optical characteristics, it is necessary for at least the port 6a on the input side and the ports 6b and 6c on the output side to be formed, however, provided that the adjustment of the optical characteristics is possible, there are no particular restrictions on the length, position, number and the like of the refractive index adjustment area 7. However, in order to adjust the branching ratio, as is shown in this example, it is preferable that the refractive index adjustment area 7 is provided on either one of the branched waveguide portions 5a and 5b.

There are no particular restrictions to the number of ports in the input and output ports of the optical coupler/splitter so long as two ports are provided at least one of the ports, and it is possible for three or more to be provided if necessary. Note that, when the multiplex light of plural signal lights is entered into a single port and the signal light is outputted from each one of plural ports, the optical coupler/splitter operates as an optical splitter. In contrast, when the signal light is entered into each one of plural ports and the multiplex light of these signal lights is outputted from a single port, the optical coupler/splitter acts as a coupler. Note also that while the term "splitter" refers to a device that performs an operation to split light and the term "coupler" refers to a device that performs an operation to combine light, because generally both operations can be performed by the same device depending on the input direction of the light, no distinction is made between the two.

In the present invention, provided that the core is provided with plural ports for the input and output of light and these ports are connected optically, there are no particular restrictions as to the configuration of the core. Namely, the present invention can be applied preferably to a planar optical coupler/splitter provided with a variety of configurations of core in addition to the Y-shaped waveguide core, such as a Mach-Zehnder interferometer, an AWG, and the like.

Note that the Y-branching optical splitter has a Y-branching type core and is an optical coupler/splitter for dividing light into two groups. In addition to dividing the power of the light into two halves, it is used with the branching ratio being appropriately set in accordance with the application. Because the present invention enables the branching ratio to be adjusted to the desired value, it is excellent for applying to a Y-branching optical splitter.

The term tap coupler is a generic name for a coupler having a large branching ratio such as, for example, the power of the light outputted from one port being 10 dB or 20 dB relative to the power of the light outputted from the other port, as is described below, and is used in what are known as tap applications. Tap couplers that use Y type optical paths as well as those that use directional couplers and Mach-Zehnder interferometers have been proposed. Because the present invention enables the branching ratio to be adjusted even when the branching ratio is large in this manner, it is excellent for applying to a tap coupler.

Moreover, when the refractive index of the core is raised by focusing the laser beam, it is possible to lengthen the effective optical path length of the core.

In the present invention, essentially it is possible to adjust the optical characteristics of an optical coupler/splitter by adjusting this effective optical path length using the raising of the refractive index. Therefore, in an optical coupler/splitter that uses a core such as a Mach-Zehnder interferometer or an AWG in which the adjustment of the effective optical path length is an important element and in other planar lightwave circuit devices, the present invention can be favorably used for the adjustment of the optical characteristics by adjusting the effective optical path length.

Note that, in the present invention, because it is possible to form the core in the interior of the cladding layer 3 by irradiating the laser beam from the exterior of the cladding layer 3, there is no need to provide the substrate 2 disposed beneath the cladding layer 3 as is the case in the conventional example shown in FIGS. 6A and 6B. However, it is also possible when necessary to employ a structure in which the substrate 2 is provided beneath the cladding layer 3.

Moreover, in this example, the portions other than the refractive index adjustment area 7 are formed by focusing the laser beam, however, it is also possible, after the portions other than the refractive index adjustment area 7 have been formed by a photolithographic method, which is the method used conventionally, to complete the core by irradiating the laser beam onto the refractive index adjustment area 7 while monitoring the optical characteristics as described above.

In this case, it is normal for a structure in which the substrate 2 is provided as is shown in FIGS. 6A and 6B to be employed.

Note that using the laser beam for the formation is preferable due to the simplicity of the manufacturing process, however, if, for example, a PLC in which an optical coupler/splitter is integrated with another optical core part is being manufactured, the manufacturing of the portions other than the refractive index adjustment area 7 using a photolithographic method may in some cases be preferable from the standpoint of productivity.

In addition, when the core is a slab type core such as is the case with AWG, the manufacturing of the portions other than the refractive index adjustment area 7 using a photolithographic method often has advantages.

Moreover, in this example, the refractive index adjustment area 7 is formed after the core of the portions other than the refractive index adjustment area 7 has been formed, however, the manufacturing method described below is also possible.

Namely, the optical coupler/splitter is obtained by first forming the entire core including the refractive index adjustment area 7, and then irradiating light from the port 6a and adjusting the optical characteristics of the optical coupler/splitter by focusing the laser beam onto the refractive index adjustment area 7 while monitoring the light outputted from the ports 6b and 6c.

In this case as well, it is possible for the core to be manufactured by focusing the laser beam and also to be manufactured by the photolithographic method that is used conventionally.

Furthermore, after the entire core including the refractive index adjustment area 7 has been formed, preferably, the laser beam is focused such that one of or both of the branched cores 5a and 5b on the port 6b side or the port 6c side of the core is scanned (preferably, the laser beam light is focused in the vicinity of the central axis of the core and the light focusing position is moved along the longitudinal direction of the core).

By altering the number of such scans, the optical characteristics of the optical coupler/splitter are able to be adjusted.

The range (length) of the core onto which light is irradiated in one scan operation is not particularly restricted and may be altered as appropriate in accordance with the objectives.

In this case, for example, it is possible for the scanning to not be performed while the optical characteristics are being monitored, but in accordance with the following method.

Namely, by scanning the laser beam while monitoring the optical characteristics after the formation of the core, the relationship between the optical characteristics and the number of laser beam scans can be determined beforehand.

Moreover, when a new optical coupler/splitter is manufactured, if the focusing of the laser beam is performed in accordance with this relationship between the optical characteristics and the number of scanning after the formation of the core, then by altering the number of scanning, it is possible to manufacture an optical coupler/splitter having the desired optical characteristics without having to monitor the optical characteristics during the manufacturing.

Accordingly, even if the manufacturing follows the same process as far as the formation of the core, by altering the number of laser beam scans during the adjustment of the optical characteristics that is performed after the formation of the core, it is possible to provide plural types of optical coupler/splitter that have different optical characteristics.

In this case as well, it is possible for the core to be manufactured by focusing the laser beam and also to be manufactured by the photolithographic method that is used conventionally.

Moreover, this method can also be used as a means for the post manufacturing adjustment of the optical characteristics of planar lightwave circuit devices including optical couplers/splitters that have completed the production process.

Here, the planar lightwave circuit devices in the present invention are those mainly using cores of the type used in optical coupler/splitters such as Mach-Zehnder interferometers, and include various types of devices such as gain equalizers, dispersion compensators, and the like in addition to optical coupler/splitters.

Furthermore, at this time, it is possible to perform the scanning while monitoring the optical characteristics and by altering and setting the number of scanning using the previously determined relationship between the number of scanning and the optical characteristics, it is also possible to adjust the optical characteristics and to obtain a device having the desired optical characteristics.

For example, by deciding the number of scanning from the previously determined relationship between the number of scanning and the optical characteristics, and then, based on this number of scanning, by performing the focusing (scanning) of the laser beam so that the optical characteristics are adjusted, it is possible to obtain a planar lightwave circuit device such as an optical coupler/splitter that has the desired optical characteristics.

Note that, it is also preferable that femto-second laser beam be used at this time for the laser beam.

EXAMPLES

The present invention will now be described in detail giving examples.

Example 1

A Y-branching optical splitter having the same structure as the optical coupler/splitter shown in FIGS. 1A and 1B was manufactured as is described below.

A glass substrate (cladding layer) having a 10 mm×10 mm×5 mm rectangular parallelepiped shape was cut from silica glass composed from 95% by weight of $SiO_2$ and 5% by weight of $GeO_2$.

Thereafter, a Y-shaped waveguide core was formed, leaving behind a refractive index adjustment area, by focusing a laser beam having an average output of 600 mW, a wavelength of 800 nm, a repetition frequency of 200 kHz, and a pulse width of 150 femto-seconds oscillated from a mode lock $Ti:Al_2O_3$ laser.

Next, the port on the input side was connected to a light source having a wavelength of 1.3 μm while the two ports on the output side were both connected to optical power meters. Signal light was then entered into the input side port and the laser beam was again focused onto the refractive index adjustment area while the branching ratio was monitored. At the point in time when the branching ratio of the signal light outputted from the two output side ports was 1:1, the irradiation of the laser beam was ended to thus obtain the Y-branching optical splitter.

Figure 2:
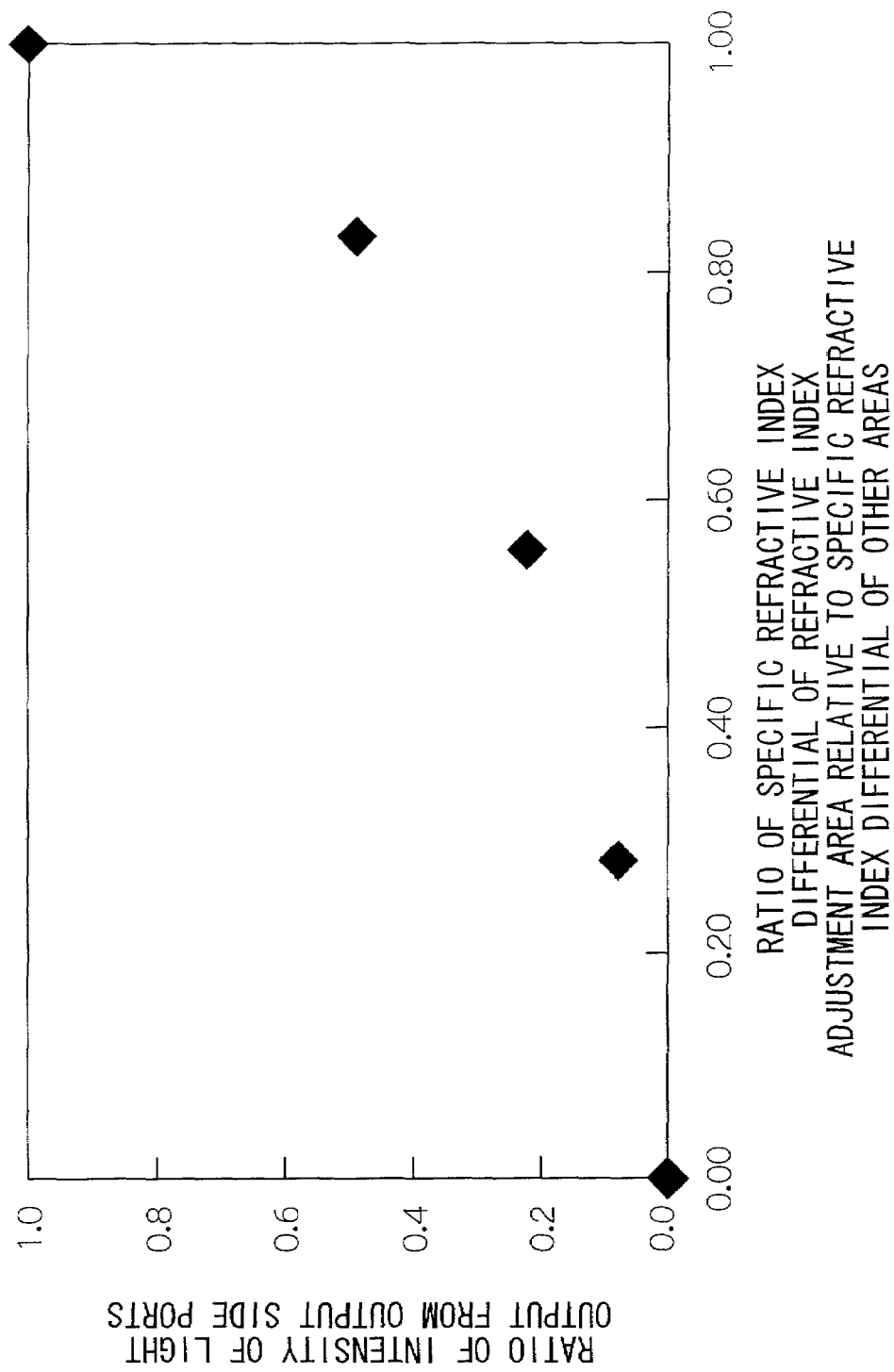
FIG. 2 is a graph showing the relationship between the specific refractive index differential of the refractive index adjustment area and the power of the signal light outputted from the output side port in the first embodiment of the present invention.

FIG. 2 is a graph showing the results obtained by computer simulation of a state in which the laser beam is focused onto the refractive index adjustment area such that the refractive index of this portion is gradually raised. In FIG. 2, the relationship in the Y-shaped waveguide core between the ratio of the specific refractive index differential of the refractive index adjustment area relative to the specific refractive index differential of the other areas and the ratio of the power of the signal light outputted from the output port of the branched core on which the refractive index adjustment area is formed relative to the power of the signal light outputted from the output port of the other branched core, is shown.

It is clear from this graph that as the refractive index of the refractive index adjustment area is raised, more of the light gradually transmitted through the refractive index adjustment area is outputted from the output end of the branched core on which the refractive index adjustment area is provided. Therefore, by adjusting the irradiation of the laser beam while monitoring such optical characteristics, it is possible to obtain the desired branching ratio.

Example 2

A Y-branching optical splitter having a large branching ratio and able to be used as a tap coupler was manufactured as is described below.

A glass substrate (cladding layer) having a 10 mm×20 mm×1 mm rectangular parallelepiped shape was cut from silica glass having an OH group content of 100 ppm or less manufactured using a VAD method.

Figure 3A:
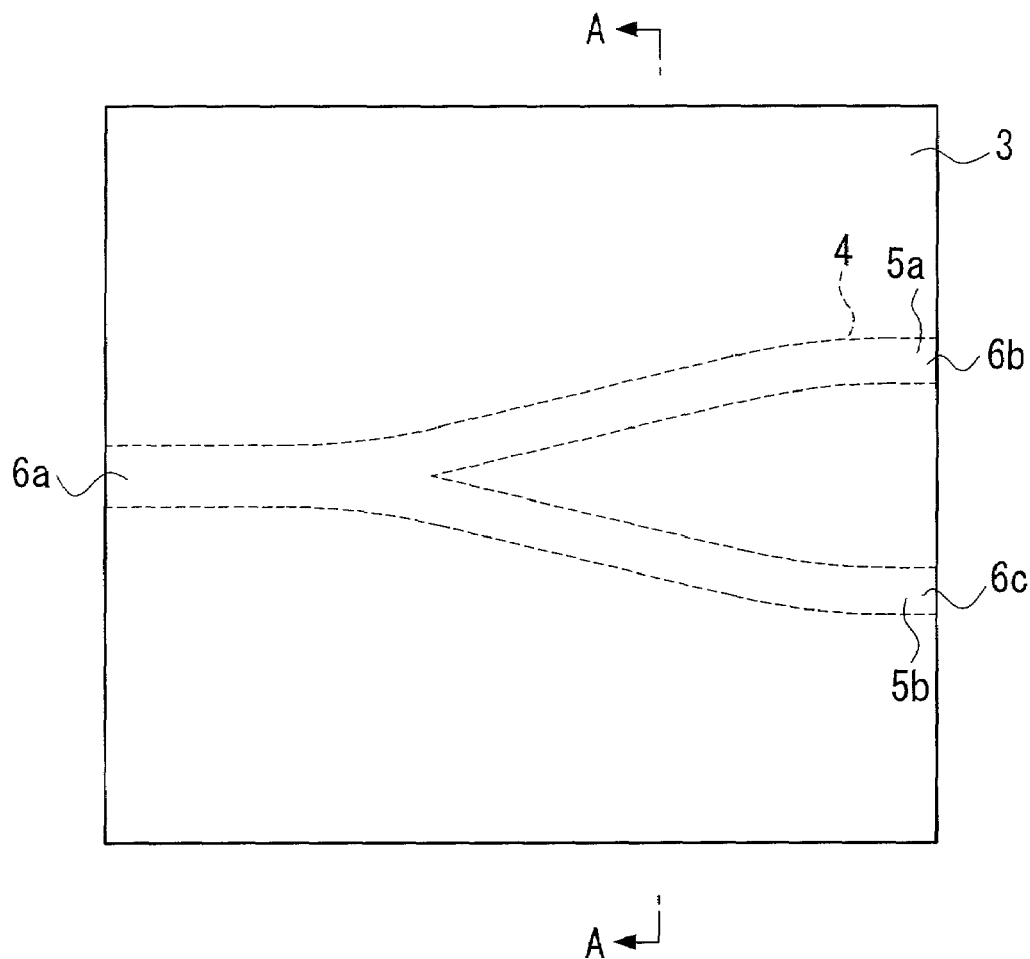
FIG. 3A is a plan view showing the Y-branching optical splitters (tap coupler) that are formed in the second embodiment of the present invention.
Figure 3B:
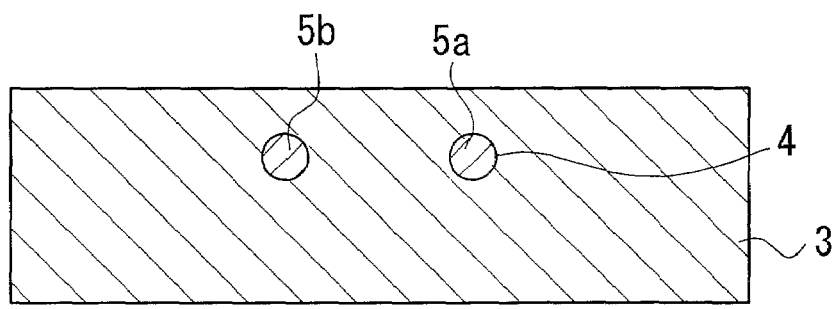
FIG. 3B is a cross sectional view taken along the line A—A in FIG. 3A.

Thereafter, a Y-shaped waveguide core having a configuration such as that shown in FIGS. 3A and 3B was formed by focusing a laser beam having an average output of 780 mW, a wavelength of 800 nm, a repetition frequency of 200 kHz, and a pulse width of 170 femto-seconds oscillated from a mode lock $Ti:Al_2O_3$ laser. Note that, at this time, a single substantially S shaped core was formed by focusing the laser beam and then two substantially S shaped cores were formed by focusing the laser beam such that the single core input side port 6a side was overlapped while the output side ports 6b and 6c side was not overlapped, so as to give cores having a configuration such as that shown in FIG. 3A.

Next, the laser beam was irradiated while altering the ratio of the number of scanning for the branched core 5a on the port 6b side and the branched core 5b on the port 6c side so that the optical characteristics were adjusted. The optical characteristics for the optical coupler/splitter thus obtained were then measured.

Figure 4:
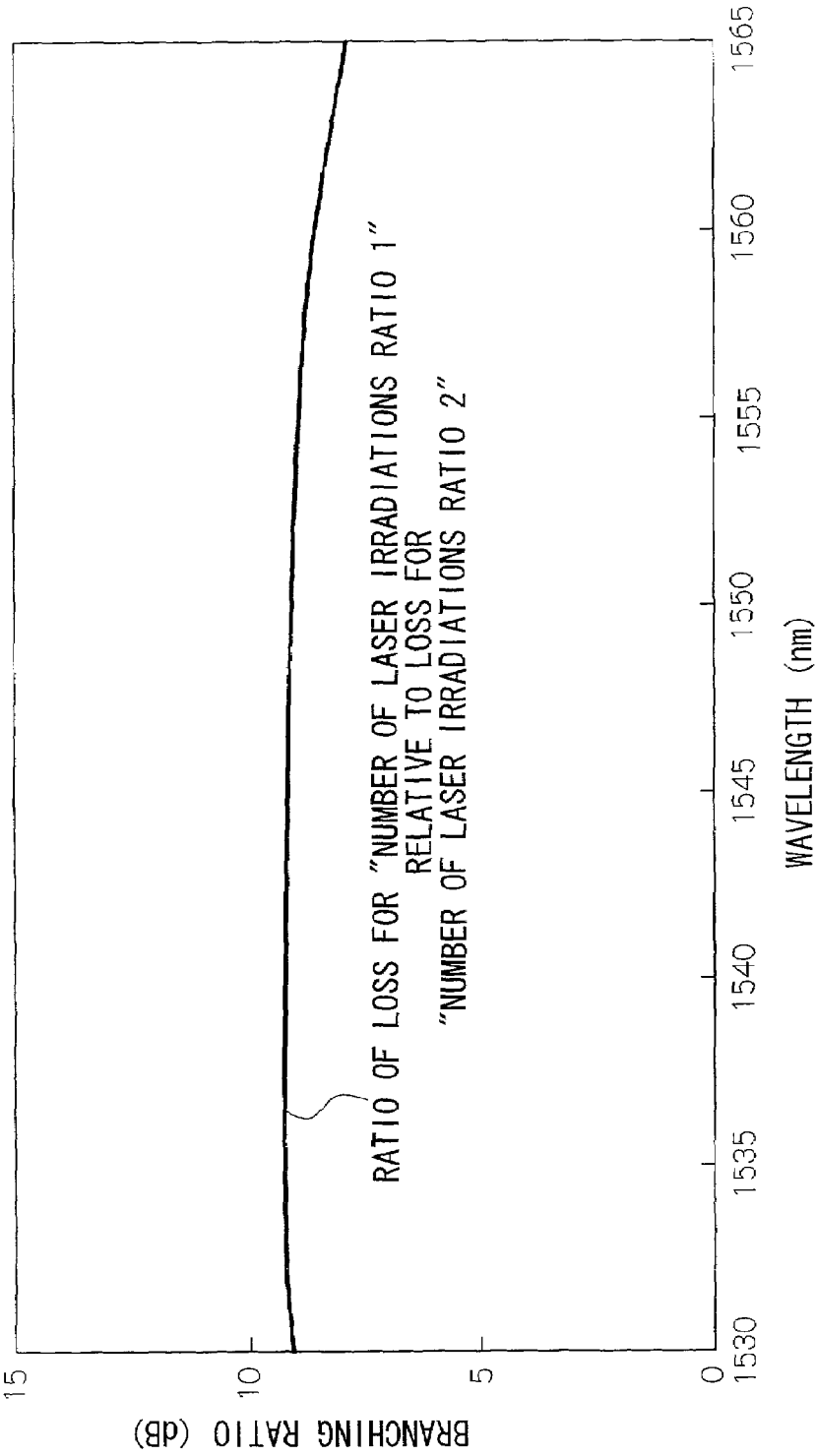
FIG. 4 is a graph showing the results when the optical characteristics are measured when the ratio of the number of scanning is set to 1:2 in the second embodiment of the present invention.

FIG. 4 is a graph showing the results when the optical characteristics were measured when the ratio between the number of laser beam scans during the adjustment of the optical characteristics of one core and the number of laser beam scans during the adjustment of the optical characteristics of the other core is set at 1:2.

Figure 5:
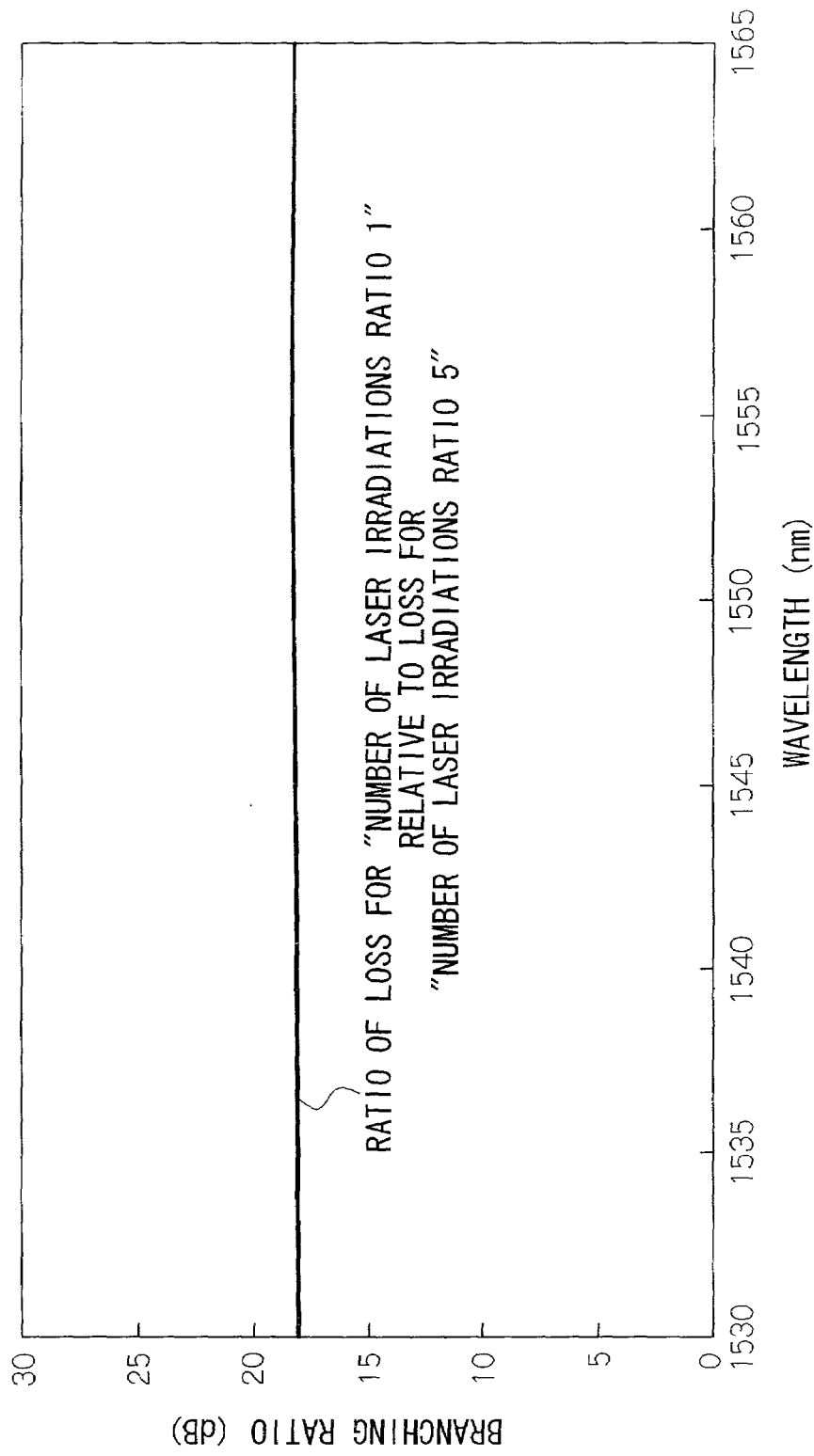
FIG. 5 is a graph showing the results when the optical characteristics are measured when the ratio of the number of scanning is set to 1:5 in the second embodiment of the present invention.

FIG. 5 is a graph showing the results when the optical characteristics were measured when the ratio between the number of laser beam scans during the adjustment of the optical characteristics of one core and the number of laser beam scans during the adjustment of the optical characteristics of the other core is set at 1:5.

Note that, in these graphs, the vertical axis is obtained from the ratio of the power of the light output from the port having the ratio of the number of scanning as 1 relative to the power of the light output from the other port. For example, if the branching ratio is 10 dB, the ratio between the power of the light output from one port relative to the power of the light output from the other port is shown to be 1:10, while this ratio is shown to be 1:100 if the branching ratio is 20 dB.

It is clear from either of these graphs that there is practically no wavelength dependency of the optical characteristics and that a tap coupler with a large branching ratio and having excellent characteristics is obtained. Moreover, in comparison with the graph shown in FIGS. 4 and 5, it is possible to adjust the branching ratio by altering the number of scanning and to thus obtain the desired optical characteristics.

As has been described above, in the present invention, it is possible to adjust the optical characteristics of an optical coupler/splitter provided with a core formed inside a cladding layer formed from a glass material during the manufacturing process. Accordingly, multiple product production in small quantities is made possible even for a planar optical coupler/splitter that is easily integrated.

Moreover, it is possible to improve the product yield by adjusting the optical characteristics of PLC including optical couplers/splitters both during the manufacturing process and after the manufacturing process. In addition, because the manufacturing is possible without using high cost photomask, this method is low in cost.

What is claimed is:

1. A method for manufacturing a planar lightwave circuit type optical coupler/splitter that is provided with plural ports for performing light input and light output inside a cladding layer formed from a glass material, and in which a waveguide core is formed that optically connects said ports, comprising the steps of:
    setting at least one portion between said ports as a refractive index adjustment area and forming portions of said waveguide core, wherein the waveguide core is not formed in the refractive index adjustment area;
    inputting signal light into one port and monitoring the signal light outputted from other ports; and adjusting optical characteristics of said optical coupler/splitter by forming the waveguide core in said refractive index adjustment area of said waveguide core by adjusting a refractive index of said refractive index adjustment area by focusing a laser beam onto said refractive index adjustment area during the monitoring.

2. The method for manufacturing a planar lightwave circuit type optical coupler/splitter according to claim 1, wherein the portions of said waveguide core other than said refractive index adjustment area are formed by focusing a laser beam.

3. A method for manufacturing a planar lightwave circuit type optical coupler/splitter that is provided with plural ports for performing light input and light output inside a cladding layer formed from a glass material, and in which a waveguide core is formed that optically connects said ports, comprising the steps of:

forming portions of said waveguide core, wherein the waveguide core is not formed in a refractive index adjustment area;

focusing a laser beam into said refractive index adjustment area;

scanning said refractive index adjustment area by shifting the focal point of said laser beam along said refractive index adjustment area repeatedly to form the waveguide core in said area; and adjusting optical characteristics of said optical coupler/splitter by changing the number of scanning.

4. The method for manufacturing a planar lightwave circuit type optical coupler/splitter according to claim 3, wherein, the number of scanning is determined beforehand based on the relationship between the optical characteristics of said optical coupler/splitter and the number of scanning.

5. The method for manufacturing a planar lightwave circuit type optical coupler/splitter according to claim 3, wherein said waveguide core is formed by focusing said laser beam.

6. The method for manufacturing a planar lightwave circuit type optical coupler/splitter according to claim 4, wherein said waveguide core is formed by focusing said laser beam.

7. The method for manufacturing a planar lightwave circuit type optical coupler/splitter according to anyone of claims 1 to 6, wherein at least one of said laser beam used to adjust said optical characteristics and said laser beam used to form said waveguide core is a femto-second laser.

8. The method for manufacturing a planar lightwave circuit type optical coupler/splitter according to anyone claims 1 to 6, wherein said optical coupler/splitter is a Y-branching optical splitter.

9. The method for manufacturing a planar lightwave circuit type optical coupler/splitter according to claim 7, wherein said optical coupler/splitter is a Y-branching optical splitter.

10. The method for manufacturing a planar lightwave circuit type optical coupler/splitter according to anyone of claims 1 to 6, wherein said optical coupler/splitter is a tap coupler.

11. The method for manufacturing a planar lightwave circuit type optical coupler/splitter according to claim 7, wherein said optical coupler/splitter is a tap coupler.

12. The method for manufacturing a planar lightwave circuit type optical coupler/splitter according to claim 8, wherein said optical coupler/splitter is a tap coupler.

13. The method for manufacturing a planar lightwave circuit type optical coupler/splitter according to claim 9, wherein said optical coupler/splitter is a tap coupler.

14. A method for adjusting optical characteristics of a planar lightwave circuit device that is provided with plural ports for performing light input and light output inside a cladding layer formed from a glass material, and in which a waveguide core that optically connects said ports is formed by focusing a laser beam, wherein the waveguide core is not formed in a refractive index adjustment area, comprising the steps of:

inputting signal light into one port and monitoring signal light outputted from other ports;

focusing said laser beam into said refractive index adjustment area between the input ports and the output ports during the monitoring;

scanning said refractive index adjustment area by shifting the focal point of said laser beam along said refractive index adjustment area repeatedly to form the waveguide core in said area; and adjusting optical characteristics of said planar lightwave circuit device by changing the number of times of scanning.

15. The method for adjusting optical characteristics of a planar lightwave circuit device according to claim 14, wherein the step of adjusting the optical characteristics of said device is lengthening an effective optical path length of said waveguide core by raising the refractive index of the portion of said waveguide core by focusing said laser beam.

16. The method for adjusting optical characteristics of a planar lightwave circuit device according to anyone of claims 14 to 15, wherein at least one of said laser beam used to form said waveguide core is a femto-second laser.

* * * * *